(12) United States Patent
Hasz (10) Patent No.: US 6,355,356 B1
(45) Date of Patent: Mar. 12, 2002

(54) COATING SYSTEM FOR PROVIDING ENVIRONMENTAL PROTECTION TO A METAL SUBSTRATE, AND RELATED PROCESSES

(75) Inventor: Wayne Charles Hasz, Pownal, VT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/444,737

(22) Filed: Nov. 23, 1999

(51) Int. Cl.$^7$ ............................. B32B 15/04; C23C 4/08
(52) U.S. Cl. ...................... 428/472; 428/610; 428/615; 428/621; 428/632; 428/668; 428/678; 428/679; 428/680; 428/937; 427/452; 427/455; 427/456; 427/383.7; 416/241 R
(58) Field of Search ................................. 428/610, 613, 428/615, 632, 668, 678, 680, 937, 472, 621; 416/241 R (56) References Cited

U.S. PATENT DOCUMENTS

| | | | |
|---|---|---|---|
| 4,116,723 A | | 9/1978 | Gell et al. |
| 4,381,944 A | * | 5/1983 | Smith et al. .................. 75/255 |
| 4,384,200 A | | 5/1983 | Taira |
| 4,639,388 A | * | 1/1987 | Ainsworth et al. ......... 428/117 |
| 4,741,286 A | | 5/1988 | Itoh et al. |
| 4,842,953 A | * | 6/1989 | Perkins et al. .............. 428/553 |
| 5,047,612 A | | 9/1991 | Savkar et al. |
| 5,066,459 A | * | 11/1991 | Beltram et al. ............ 420/58.8 |
| 5,332,598 A | | 7/1994 | Kawasaki et al. |
| 5,399,313 A | | 3/1995 | Ross et al. |
| 5,523,169 A | * | 6/1996 | Rafferty et al. ............. 428/551 |
| 5,683,825 A | * | 11/1997 | Bruce et al. ................ 428/698 |
| 5,783,318 A | * | 7/1998 | Biondo et al. .............. 428/680 |
| 5,851,678 A | * | 12/1998 | Hasz et al. .................. 428/469 |
| 5,914,189 A | * | 6/1999 | Hasz et al. .................. 428/335 |
| 5,942,337 A | * | 8/1999 | Rickerby et al. ........... 428/623 |
| 6,210,802 B1 | * | 4/2001 | Hasz et al. |

* cited by examiner

Primary Examiner—John J. Zimmerman
Assistant Examiner—Jennifer McNeil
(74) Attorney, Agent, or Firm—Noreen C. Johnson; Christian G. Cabou (57) ABSTRACT

A metal article which includes a protective coating system is described. The coating system includes a braze alloy layer and a plasma-sprayed bond coat. The bond coat may lie on top of the braze alloy layer, or the braze alloy layer may lie on top of the bond coat. In the case of a porous bond coat, partial or complete densification of the bond coat is sometimes carried out. Densification is achieved by heat treating the article, so that the braze alloy material migrates into the pores of the bond coat to a selected thickness. Related processes are also described.

50 Claims, 3 Drawing Sheets fig. 1 fig. 2 fig. 3

COATING SYSTEM FOR PROVIDING ENVIRONMENTAL PROTECTION TO A METAL SUBSTRATE, AND RELATED PROCESSES

BACKGROUND OF THE INVENTION

This invention was made with government support under Contract No. DEFC21-95MC31176 awarded by DoE. The government may have certain rights to the invention.

This invention generally relates to environmental coating systems for protecting metal substrates. According to some specific embodiments, the invention is directed to improved thermal barrier coating systems for metal components used in turbine engines. The invention also relates to processes for applying and treating such coating systems.

Many types of metals are used in industrial applications. When the application involves demanding operating conditions, specialty metals are often required. As an example, components within gas turbine engines operate in a high-temperature environment. Many of these components are formed from nickel-base and cobalt-base superalloys. Since the components must withstand in-service temperatures in the range of about 1100° C.–1150° C., the superalloys are often coated with thermal barrier coating (TBC) systems. These coating systems usually include a bond coat applied directly to the superalloy substrate, and a ceramic-based overcoat applied over the bond coat. For a jet engine, the coatings are applied to various superalloy surfaces, such as turbine blades and vanes, combustor liners, and combustor nozzles.

The effectiveness of a TBC system is often measured by the number of thermal cycles it can withstand before it delaminates from the substrate which it is protecting. In general, coating effectiveness decreases as the exposure temperature is increased. The failure of a TBC is often attributed to weaknesses or defects related in some way to the bond coat, e.g., the microstructure of the bond coat, or deficiencies at the bond coat-substrate interface or the bond coat-TBC interface.

The microstructure of the bond coat is often determined by its method of deposition. The deposition technique is in turn often determined by the requirements for the overlying protective coating. For example, many TBC's are applied by a thermal spray technique, such as air plasma spray (APS). Coatings applied by such a method usually require a very rough bond coat surface for effective adhesion to the substrate. APS techniques are often used to provide such a surface for the bond coat.

While the APS process has several advantages, it also results in a porous coating microstructure. Such a microstructure allows significant internal oxidation of the bond coat. The oxidation of regions of the bond coat often reduces the concentration of aluminum in other bond coat regions. This phenomenon can in turn result in the diffusion of aluminum from an adjacent, aluminum-containing substrate, e.g., a superalloy. The depletion of aluminum from a superalloy substrate is especially severe when the component is used at the elevated temperatures described above. The loss of aluminum can be detrimental to the integrity of superalloy components.

In U.S. Pat. No. 6,165,628, problems associated with the microstructure of porous bond layers are addressed. In one embodiment of the reference, a bi-layer is used to bond a TBC to a metal substrate. The bi-layer includes a dense, primary bond layer over the substrate, and a "spongy" secondary bond layer over the dense layer. The primary bond layer is usually applied by a vacuum plasma spray (VPS) or high velocity oxy-fuel (HVOF) technique. The spongy, secondary bond layer is usually applied by APS. The primary bond layer helps to protect the substrate from excessive oxidation. The secondary bond layer promotes adhesion between the primary layer and the subsequently-applied TBC, while also acting as a strain-reliever between these two other layers. The resulting TBC system exhibits high integrity during exposure to high temperatures and frequent thermal cycles.

There is continuing interest in the development of other, improved coating systems which protect the substrate from excessive oxidation, while also providing environmental protection, e.g., thermal barrier properties. Systems in which the TBC adheres securely to an underlying bond coat are also very desirable. Furthermore, new coating systems which provide alternative methods for hermetically sealing the bond coat or the substrate would also be welcome in the art. Moreover, the TBC system should be very effective in protecting components used in high performance applications, e.g., superalloy parts exposed to high temperatures and frequent thermal cycles.

SUMMARY OF THE INVENTION

One embodiment of this invention is an article which comprises a metal-based substrate, and at least two layers overlying the substrate, wherein one of the layers is a coating which comprises a braze alloy, and another layer is a plasma-sprayed bond coat. The braze alloy often comprises a nickel-base or cobalt-base material, while the bond coat is often an MCrAlY-type material, where M is selected from the group consisting of Fe, Ni, Co, and mixtures of any of the foregoing. Moreover, the bond coat is often substantially porous, as described below.

The bond coat may lie on top of the braze alloy layer, or the braze alloy layer may lie on top of the bond coat. In the case of a porous bond coat (e.g., one applied by APS), partial or complete densification of the bond coat is sometimes carried out. The densification is achieved by heat treating the article, so that the braze alloy material migrates into the pores of the bond coat to a selected thickness. When the braze alloy layer is below the bond coat, the braze alloy material migrates upwardly into the bond coat. When the braze alloy layer is above the bond coat, the braze alloy material migrates downwardly into the bond coat. The article may further include a thermal barrier coating as the uppermost layer.

Another embodiment of this invention is directed to a method for providing environmental protection to a metal-based substrate, comprising the steps of applying a coating which comprises a braze alloy over the substrate, and plasma-spraying a bond coat over the substrate. As described previously, the two steps are interchangeable, and can be supplemented by the densification step. As used herein, "environmental protection" refers to protection of a metal substrate from the adverse effects of oxidation, corrosion, and chemical attack. Thus, the processes claimed herein are especially suitable for protecting turbine engine components which may be exposed to extreme operating conditions.

Further details regarding the various features of this invention are found in the remainder of the specification.

DETAILED DESCRIPTION OF THE INVENTION

The article of this invention includes a metal-based substrate, which can be formed from a variety of metals or metal alloys. The term "metal-based" in reference to substrates disclosed herein refers to those which are primarily formed of metal or metal alloys, but which may also include some non-metallic components, e.g., ceramics, intermetallic phases, or intermediate phases. Usually, the substrate is a heat-resistant alloy, e.g., superalloys which typically have an operating temperature of up to about 1000–1150° C. The term "superalloy" is usually intended to embrace complex cobalt- or nickel-base alloys which include one or more other elements such as aluminum, tungsten, molybdenum, titanium, and iron. Superalloys are described in various references, such as U.S. Pat. Nos. 5,399,313 and 4,116,723, both incorporated herein by reference. Directionally solidified and single crystal superalloys may also be used in this invention. High temperature alloys are also generally described in Kirk-Othmer's *Encyclopedia of Chemical Technology*, 3rd Edition, Vol. 12, pp. 417–479 (1980), and Vol. 15, pp. 787–800 (1981). Nickel-base superalloys typically include at least about 40 wt % Ni. Illustrative alloys are designated by the trade names Inconel®, Nimonic®, Rene® (e.g., Rene® 80-, Rene® 95 alloys), and Udimet®. Cobalt-base superalloys typically include at least about 30 wt % Co. Commercial examples are designated by the trade names Haynes®, Nozzaloy®, Stellite®, and Ultimet®. The actual configuration of a substrate may very widely. For example, the substrate may be in the form of various turbine engine parts, such as combustor liners, combustor domes, shrouds, buckets, blades, nozzles, or vanes.

As mentioned previously, one of the layers overlying the substrate is a coating which comprises a braze alloy. Braze alloy compositions are known in the art and commercially available. Two classes of such compositions are frequently used: standard liquid brazes and activated diffusion brazes.

Very often (but not always), the braze alloy has a composition similar to that of the substrate. For example, if the substrate is a nickel-base superalloy, the braze alloy usually contains at least about 40% by weight nickel, along with various other elements, like chromium, aluminum, and yttrium. (Nickel-containing braze or cobalt-containing braze alloys are usually used with cobalt-base superalloys). The braze alloy composition also typically contains one or more components for lowering its melting point. Examples of melting point suppressants for nickel-base and cobalt-base braze alloy compositions are silicon, boron, phosphorous, or combinations thereof. Silicon or boron, or combinations thereof, are often preferred. The braze alloy composition may also contain other additives known in the art, e.g., fluxing agents. (For the purpose of brevity, the "coating which comprises a braze alloy" will sometimes be referred to herein as the "braze alloy coating" or the "braze alloy composition".)

Exemplary nickel-base braze alloy compositions are provided below. The components are designated in weight percent:

1) 4.5 Si, 14.5 Cr, 3.3 B, and 4.5 Fe, balance Ni;
2) 15 Cr, 3.5 B, balance Ni;
3) 4.5 Si, 3 B, balance Ni;
4) 4.2 Si, 7 Cr, 3 B, and 3 Fe, balance Ni;
5) 10 Si, 19 Cr, balance Ni;
6) 3.5 Si, 22 Co, 2.8 B, balance Ni;
7) 3.5 Si, 1.8 B, balance Ni;
8) 4.5 Si, 14 Cr, 3 B, and 4.5 Fe, balance Ni;
9) 17 Cr, 9 Si, 0.1 B, balance Ni;
10) 2.6 Si, 2 Cr. 2 B, and 1 Fe, balance Ni;
11) 15 Cr, 8 Si, balance Ni;
12) 10.1 Si, 19.0 Cr, balance Ni;
13) 4.5 Fe, 4.5 Si, 14.0 Cr, 3.1 B, 0.75 C, balance Ni;
14) 4.5 Fe, 4.5 Si, 14.0 Cr, 3.1 B, balance Ni;
15) 4.5 Si, 3.1 B, balance Ni;
16) 11.0 P, balance Ni; and
17) 10.1 P, 14.0 Cr, balance Ni.

Some preferred nickel-base braze alloy compositions for the present invention comprise about 5 wt % to about 15 wt % silicon or boron; and about 15 wt % to about 25 wt % chromium, with the balance being nickel. Silicon is sometimes preferred over boron. Mixtures of silicon and boron are also possible.

Exemplary cobalt-base braze alloy compositions include:
1) 8 Si, 19 Cr, 17 Ni, 4 W, 0.8 B, balance Co; and
2) 17.0 Ni, 1.0 Fe, 8.0 Si, 19.0 Cr, 0.8 B, 0.4 C, balance Co.

It should be noted that other types of braze alloys may be used, e.g., precious metal compositions containing silver, gold, and/or palladium, in combination with other metals, such as copper, manganese, nickel, chrome, silicon, and boron. Mixtures which include at least one of the braze alloy elements are also possible. Many of the metal braze compositions are available from Praxair Surface Technologies, Inc.

Various techniques for applying the braze alloy can be employed, e.g., a thermal spray technique. Examples include vacuum plasma deposition (VPS), high velocity oxy-fuel (HVOF), and air plasma spray (APS), all of which are known in the art. Other deposition techniques could be used as well, such as sputtering or physical vapor deposition (PVD).

In an alternative technique for applying the braze alloy, a free-standing braze foil can be employed. Methods for making such braze foils are known in the art. Moreover, the braze foils are commercially available from various sources, such as Wesgo and Allied Signal Company. The braze foil can be tack-welded to the underlying layer, or an adhesive can be used. (The identity of the "underlying layer" to which the braze coating is applied will differ according to various embodiments of this invention. As further described below, the "underlying layer" may be the substrate, or may be the plasma-sprayed bond coat.)

As still another alternative, the braze alloy composition can be in the form of a green braze tape. Such tapes are well-known in the art, and are commercially available, e.g., the Amdry® line of tapes from Sulzer-METCO, Inc. They can be obtained with an adhesive on one side, so that the tape can be attached to the underlying layer.

As another alternative, the braze material can be utilized in the form of a slurry, which usually contains metal powder, binder, and optionally, solvent. A variety of binder materials may be used, e.g., water-based organic materials such as polyethylene oxide and various acrylics, or solvent-based binders. Conventional details related to the mixing of the slurry are described in various references, such as U.S. Pat. No. 4,325,754, which is incorporated herein by reference.

Slurry compositions are also commercially available. Use of the braze slurry compositions is advantageous in various situations. For example, when the underlying surface is irregular, or contains pits or crevices, the braze slurry can be used to fill such regions. Various techniques are available for applying the braze slurry composition. For example, it can be sprayed, painted, or tape-cast onto the underlying surface.

In one embodiment of this invention, the step of applying the coating of braze alloy is carried out before the step of applying the plasma-sprayed bond coat. The article thus comprises:

(I) a metal-based substrate;
(II) a braze alloy coating directly over the substrate; and
(III) a plasma-sprayed bond coat directly over the braze alloy coating.

(As described further below, a ceramic coating, e.g., a thermal barrier coating, can be subsequently applied as the outermost layer).

In this embodiment, the braze alloy is applied directly to the surface of the substrate, and is fused (e.g., brazed or welded) thereto. Those of ordinary skill in the art are familiar with the details regarding brazing. Brazing temperatures depend in part on the type of braze alloy used, and are typically in the range of about 525° C. to about 1650° C. In the case of nickel-base braze alloys, braze temperatures are usually in the range of about 800° C. to about 1260° C. When possible, brazing is often carried out in a vacuum furnace. The amount of vacuum will depend in part on the composition of the braze alloy. Usually, the vacuum will be in the range of about $10^{-1}$ torr to about $10^{-8}$ torr. The braze layer is relatively dense, and provides a measure of protection to the substrate from corrosion and/or excessive oxidation.

If the braze alloy layer is to be applied to an area which does not lend itself to the use of a furnace (e.g., when the component itself is too large to be inserted into a furnace), a torch or other localized heating means can be used. For example, a torch with an argon cover shield or flux can be directed at the brazing surface. Specific, illustrative types of heating techniques for this purpose include the use of gas welding torches (e.g., oxy-acetylene, oxy-hydrogen, air-acetylene, air-hydrogen); RF welding; ITIG (tungsten inert-gas) welding; electron-beam welding; resistance welding; and the use of IR lamps.

A bond coat is then applied over the braze alloy layer. Various types of bond coats can be applied by the method of the present invention. The compositions for such layers are well-known in the art. Very often, the bond coatings are formed of an MCrAlY material, where "M" can be various metals or combinations of metals, such as Fe, Ni, or Co. Some of the preferred alloys of this type have a broad composition (in weight percent) of about 17% to about 23% chromium; about 4% to about 13% aluminum; and about 0.1% to about 2% yttrium; with M constituting the balance. In some embodiments, M is a mixture of nickel and cobalt, wherein the ratio of nickel to cobalt is in the range of about 10:90 to about 90:10, by weight.

The bond coat is usually applied by a thermal spray technique, e.g., a plasma spray process such as APS. Plasma spray techniques are known in the art and described, for example, in the Kirk-Othmer *Encyclopedia of Chemical Technology*, 3rd Edition, Vol. 15, page 255, and references noted therein. U.S. Pat. Nos. 5,332,598; 5,047,612; and 4,741,286 are also instructive in regard to various aspects of plasma spraying, and are incorporated herein by reference. In general, the typical plasma spray techniques involve the formation of a high-temperature plasma, which produces a thermal plume. The coating material, in the form of a powder, is fed into the plume. The powder particles melt in the plasma and are accelerated toward the substrate being coated. (The process is often referred to as "APS" when it is carried out in an air environment). Those of ordinary skill in the plasma spray coating art are familiar with various details which are relevant to applying the coating, e.g., plasma spray parameters such as spray distances (gun-to-substrate); selection of the number of spray-passes; powder feed rate, torch power, plasma gas selection, and the like.

The thickness of the bond coat will depend on various factors, such as the oxidation protection and corrosion protection desired for the component, as well as material costs. The shape and size of the part may also be considered, since the thickness of the bond layer should not exceed dimensional tolerances. A weight limit for the part may be an additional factor for consideration (especially in the case of an airfoil), since the bond coat will add some weight to the component. In general, the thickness will be in the range of about 50 microns to about 500 microns, and preferably, in the range of about 100 microns to about 400 microns. In especially preferred embodiments, the thickness will be in the range of about 200 microns to about 300 microns.

Plasma-sprayed bond coats—especially those applied by APS—are substantially porous, e.g., "spongy". These bond coats usually comprise an open network of interconnected pores. The pores are generally located between layers of oxide which are entrained on particles of the bond coat material. As described in U.S. Pat. No. 6,165,628 of D. Gray et al (filed on Aug. 30, 1999 and incorporated herein by reference), the bond coat microstructure may be characterized by "line length". Line length is the sum of the strings of entrained oxide (i.e., lengths of porosity) in a given section of the coating. Such a measurement can be obtained by an image analysis of the section, using, for example, an optical microscope. As used herein, the term "string of oxide" is meant to exclude features which have closed porosity. No entrained oxide is present in those types of features, and the "strings" are generally not elongated or interconnected, as in the case of the desired microstructure.

In preferred embodiments, the microstructure of the spongy bond coat has at least about 225 continuous strings of oxide greater than 25 microns in length, per square millimeter of sample (viewed in cross-section), as measured by an optical microscope, 1500X magnification. Bond coats of this type (e.g., APS-sprayed) usually have a very rough surface, e.g., an "Ra" (root mean square roughness) value greater than about 600 micro-inches. Such a surface is very desirable for increasing the adhesion of a subsequently-applied thermal barrier coating.

As applied, the braze alloy layer provides significant advantages. For example, it hermetically seals the substrate in this embodiment, thereby helping to protect the substrate from environmental attack. However, in some preferred embodiments of this invention, the braze alloy layer is subjected to an additional heat treatment. The heat treatment is carried out after the application of the substantially porous bond coat, and causes the braze alloy material to "infiltrate" the bond coat. The heat treatment can be carried out by any of the techniques discussed above, e.g., use of a vacuum furnace or welding technique. The heat treatment causes a portion of the braze alloy material to liquefy. The liquefied material migrates upwardly into the pores of the bond coat. In this manner, at least a portion of the bond coat is densified. An illustration of the densification of the bond coat is provided in the examples which follow.

The densified region of the bond coat helps to protect the substrate in environments in which the overall coating system may be exposed to damaging conditions, e.g., excessive oxidation. The porous region of the bond coat serves to promote adhesion between the bond coat and a subsequently-applied thermal barrier coating. In that regard, the overall bond coat is similar to the bi-layer coating system (i.e., primary bond layer and secondary bond layer) described in U.S. Pat. No. 6,165,628.

The heat treatment for densification can be carried out immediately after the deposition of the bond coat, or at a later stage. For example, in some preferred embodiments, the heat treatment is carried out after a thermal barrier coating is applied, as described below. In fact, the heat treatment can be effected by way of any other heat treatment (of appropriate temperature and duration) which is typically carried out for the metal-based substrate.

Any thickness of the bond coat can be densified. The choice as to the degree of densification will depend on various factors, such as the type of coating being applied over the bond coat; the amount of environmental protection required for the article, and the like. Often, about 10% to about 80% of the depth of the bond coat is densified. In some preferred embodiments, about 35% to about 65% of the depth of the bond coat is densified.

The heating conditions required for densification depend on various factors. They include: the composition and microstructure of the bond coat (e.g., its degree of porosity); the degree of densification desired; the amount of braze alloy material present in the braze alloy layer; and the composition, flow-characteristics, and melting point of the braze alloy composition. For this embodiment, the braze alloy composition should have a melting point which is below that of the substrate material and the bond coat material.

As a non-limiting illustration, one of the preferred braze compositions described previously (e.g., 5–15 wt % Si or B; 15–25 wt % Cr, balance Ni) could be applied and brazed to a nickel-base substrate, at a thickness in the range of about 10 microns to about 125 microns. (The desired thickness of the braze layer depends in part on the thickness of the bond coat). A "spongy" bond coat formed from an MCrAlY-type alloy could then be applied over the braze alloy coating by an APS technique. The bond coat would have an exemplary thickness in the range of about 100 microns to about 650 microns. In such an instance, densification of about 35% to about 65% of the depth of the bond coat (as measured from the braze coating/bond coat interface) will usually require a heat treatment in the range of about 1025° C. to about 1250° C., for about 10 minutes to about 60 minutes. Based on the teachings presented herein, those skilled in the art can determine the most appropriate heating regimen for a given coating system, and adjust the above parameters accordingly.

In another embodiment of this invention, the step of applying the plasma-sprayed bond coat is carried out before the braze alloy is applied. In other words, the bond coat is applied directly to the substrate. As in other embodiments, the preferred plasma-spray technique here is often APS. This technique is relatively simple to carry out, and it provides a rough surface for good adhesion by a subsequently-applied layer, e.g., a TBC. A braze alloy composition like those described above is applied over the bond coat, by one of the techniques described previously, e.g., a thermal spray technique, or the use of a tape, slurry, or foil. As those skilled in the art understand, a heat treatment must be used in the case of the tape, slurry, or foil, to fuse the braze material to the bond coat surface. Conventional techniques may be used, e.g., a vacuum heat treatment or a welding technique.

When the braze composition is applied by a thermal spray technique such as APS, it tends to adhere to both the peaks and valleys of the rough bond coat surface. In this manner, the braze composition substantially replicates the surface profile of the bond coat, thereby ensuring good adhesion for any subsequently-applied coating. Moreover, the relatively dense microstructure of the braze composition protects both the bond coat and the substrate from corrosion and/or other environmental dangers.

As another option, the braze alloy layer which overlies the bond coat (and is fused thereto) can be subjected to an additional heat-treatment, i.e., in addition to any braze-fusing treatment applied. The additional heat treatment is especially useful when the bond coat is substantially porous, e.g., a spongy bond coat applied by APS. The heat treatment causes a portion of the braze alloy material to liquefy. The liquefied material migrates downwardly into the pores of the bond coat, densifying the latter. This densification from the "top" of the bond coat can be controlled in a manner analogous to that described previously, i.e., densification from the "bottom" of the bond coat. Thus, densification can be effected through any depth of the bond coat, e.g., from 10% of its depth to 100% of its depth, as measured from its top surface. Usually, about 35% to about 65% (and often, about 45%–55%) of the bond coat is densified. The previous discussion regarding heating conditions and braze alloy selection is also applicable for this embodiment. As in previous embodiments, the densified section of the bond coat helps to protect the substrate from excessive oxidation. Moreover, the heat treatment can be carried out after a thermal barrier coating is applied.

It should thus be apparent that another aspect of the present invention is an article, comprising:

(A) a metal-based substrate;
(B) a plasma-sprayed bond coat applied over the substrate; and
(C) a coating which comprises a braze alloy, applied over the plasma-sprayed bond coat.

The possible compositions of each of components (A), (B) and (C) have been described above. As also described previously, the bond coat, or a portion thereof, can be densified by way of infiltration of the braze alloy. Thus, articles which include a bond coat having a densified region adjacent the braze alloy coating are also within the scope of the present invention, as are articles in which the entire bond coat is densified.

In most embodiments of the present invention, a ceramic coating is applied as the outermost layer of the coating system. In other words, the ceramic coating is applied over the braze alloy layer or the plasma-applied bond coat, depending on which layer was last-applied. Usually, the ceramic coating is a thermal barrier coating, and these are typically zirconia-based. As used herein, "zirconia-based" embraces ceramic materials which contain at least about 70% zirconia, by weight. Zirconia is a well-known compound for barrier coatings. Its use is described, for example, in Kirk-Othmer's *Encyclopedia of Chemical Technology*, 3rd Edition, V. 24, pp. 882–883 (1984). In preferred embodiments, the zirconia is chemically stabilized by being blended with a material such as yttrium oxide, calcium oxide, magnesium oxide, cerium oxide, scandium oxide, or mixtures of any of those materials. In one specific example, zirconia can be blended with about 1% by weight to about 20% by weight yttrium oxide (based on their combined weight), and preferably, from about 3%–10% yttrium oxide.

Various techniques may be used to apply the ceramic coating. Examples include a plasma spray technique such as APS; physical vapor deposition (IPVD), or electron beam physical vapor deposition (EB-PVD). Those of ordinary skill in the art are familiar with the details regarding each of these deposition techniques. Related references include Kirk-Othmer's *Encyclopedia of Chemical Technology*, 3rd Edition, Vol. 15, (1981) and Vol. 20 (1982); Ullmann's *Encyclopedia of Industrial Chemistry*, Fifth Edition; Volume A6, VCH Publisher (1986); *Scientific American*, H. Herman, September 1988; and U.S. Pat. No. 5,384,200. The thickness of the TBC will also depend in part on the type of article being coated, as well as the thermal environment to which it will be exposed Usually its thickness will be in the range of about 125 microns to about 2500 microns. In preferred embodiments for end uses such as turbine engine airfoil components, the thickness is often in the range of about 250 microns to about 1150 microns.

The following examples are provided for illustration, and should not be considered to be any type of limitation on the scope of the present invention.

EXAMPLE 1

In this example, the substrate was a coupon made from a nickel-base superalloy. After being grit-blasted and ultrasonically cleaned, the surface of the substrate was covered with a green braze tape (from Amdry), having the following composition: 10 wt. % Si, 19 wt. % Cr, balance Ni. The tape was about 0.005 inch/0.013 cm thick. The green tape was then vacuum-brazed for 30 minutes at 2100° F. (1149° C.), to fuse the tape to the substrate.

An NiCrAlY-type bond coat was then applied over the braze coating. Deposition of the bond coat was carried out by air plasma spray (APS), using a MFTCO 7-MB spray gun and standard operating conditions. The resulting microstructure of the bond coat was spongy, i.e., containing open networks of interconnected pores, as described in the above-referenced U.S. Pat. No. 6,165,628. The thickness of the bond coat was approximately 0.013 inch/330 microns. In this example, the bond coat was not subjected to an additional heat-treatment for partial or total densification. Deposition of the bond coat was followed by the air plasma-spraying of a zirconia-yttria TBC (0.015 inch/381 microns thickness), under standard spray conditions.

Figure 1:
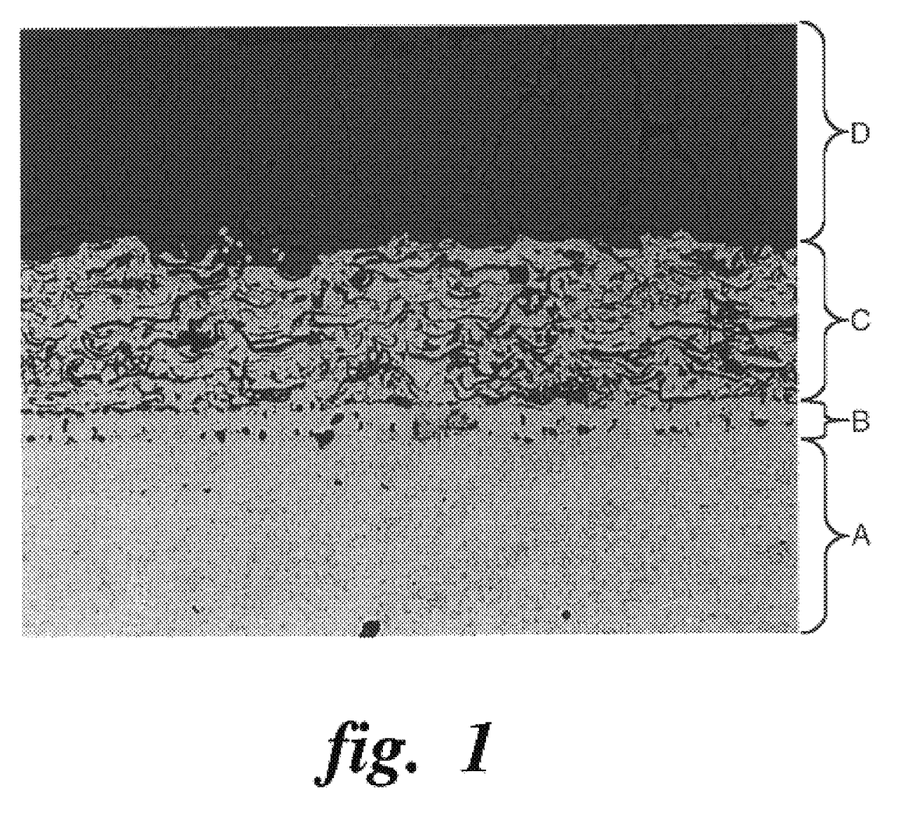
FIG. 1 is a photomicrograph of a cross-section of a coating system applied on a metal substrate, according to the present invention.

FIG. 1 is a photomicrograph of the resulting coating system. Region A is the substrate, while region B is the braze layer. Region C is the bond coat. Its spongy nature is clearly evident, and comprises an open network of interconnected pores. Region D is the zirconia-based TBC layer. As shown in the figure, the braze layer is very dense, and provides a barrier between the spongy bond coat and the substrate.

Furnace cycle testing (FCT) was carried out for the sample, with one cycle representing 45 minutes at 2000° F. (1093° C.). The coating, sample of this invention was compared to a sample which included the same substrate, the same APS-sprayed NiCrAlY bond coat, and the same zirconia-based TBC. (The same approximate thicknesses for each layer were present). However, the comparative sample did not include the braze coating. The results demonstrated that the sample of this invention had a furnace cycle life which was about 2.7 times greater than that of the comparative sample.

EXAMPLE 2

In this example, the same type of substrate used in Example 1 was again treated and covered with the braze tape, which was then brazed as described previously. The NiCrAlY-type bond coat was subsequently applied by APS. A zirconia-yttria TBC (0.015 inch/381 microns thickness) was applied over the bond coat layer. The coupon was then-heated in a vacuum furnace at about 1121° C. (2050° F.) for about 30 minutes, causing infiltration of the braze material up into a portion of the bond coat layer.

Figure 2:
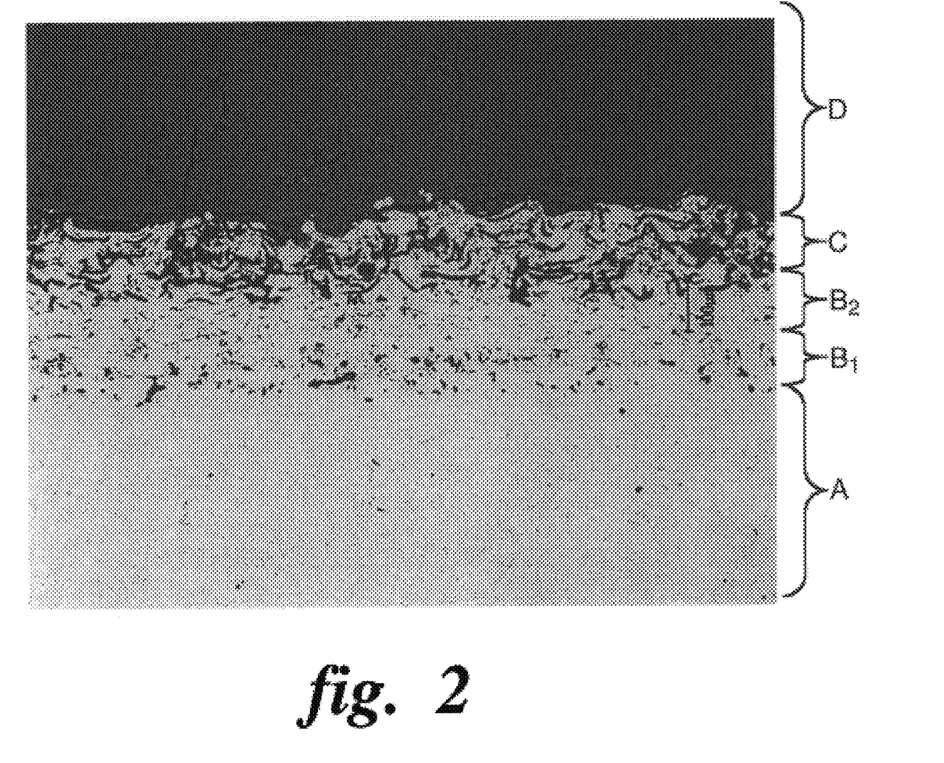
FIG. 2 is a photomicrograph of a cross-section of another coating system applied on a metal substrate, in which one layer of the coating system is partially densified according to this invention.

FIG. 2 is a photomicrograph of the resulting coating system. Region A is the substrate, while region $B_1$ is the residual braze alloy layer which remains after a portion of the braze material infiltrates into the bond coat. Region $B_1$ is a very thin layer for this particular sample, and its boundary with Region $B_2$ is not highly defined. Region $B_2$ is the densified portion of the bond coat, in which a substantial number of the pores have been filled with the liquid braze material. The region has an average thickness of about 140–160 microns, which represents about 50% of the thickness of the bond coat in this instance.

Region C is the portion of the bond coat which remains spongy, i.e., which has not been densified by migration of the braze alloy material. The region also has an average thickness of about 140–160 microns, which represents about 50% of the thickness of the bond coat. Region D is the zirconia-based TBC layer.

Furnace cycle testing (FCT) was carried out for the sample, as in Example 1. Again, the comparative sample was substantially identical to the sample for this invention, except that it did not include the braze coating. The results demonstrated that the sample of this invention had a furnace cycle life which was about 3.3 times greater than that of the comparative sample.

EXAMPLE 3

In this example, the same type of substrate used in Example 1 was again treated and covered with the braze tape, which was then brazed as described previously. The NiCrAlY-type bond coat was subsequently applied by APS. A zirconia-yttria TBC (0.015 inch/381 microns thickness) was applied over the bond coat layer. The coupon was then heated in a vacuum furnace at about 1177° C. (2150° F.) for 30 minutes, causing infiltration of the braze material up into substantially the entire thickness of the bond coat layer.

Figure 3:
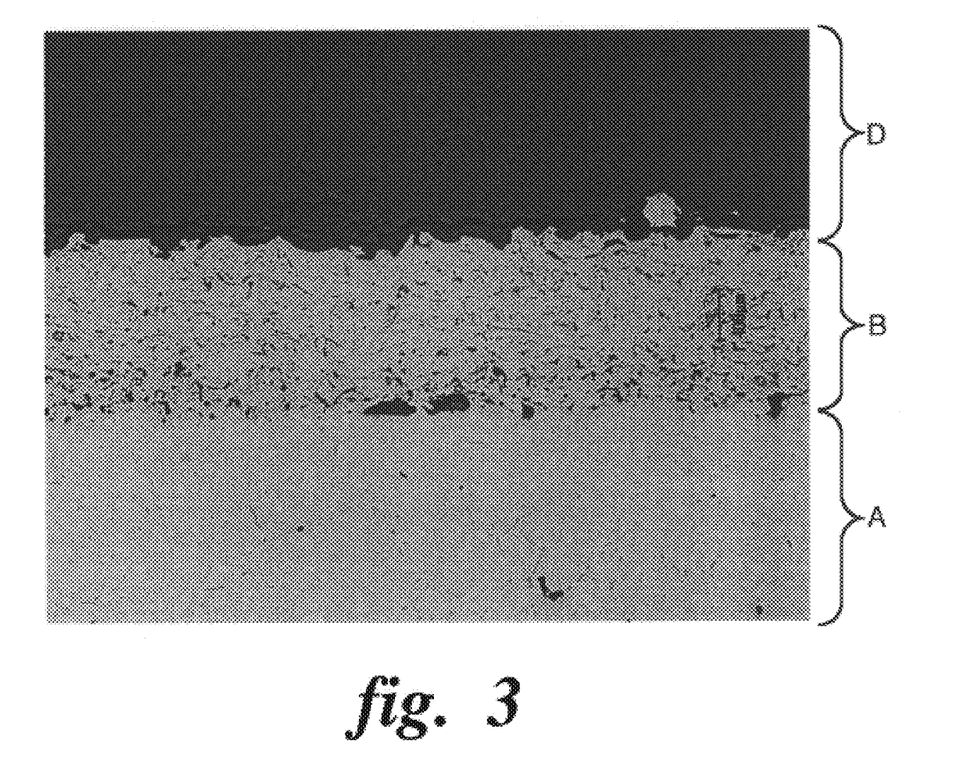
FIG. 3 is a photomicrograph of a cross-section of another coating system applied on a metal substrate for this invention, in which a layer of the coating system has been completely densified.

FIG. 3 is a photomicrograph of the resulting coating system. Region A is the substrate, while region B is the densified bond coat. (A very thin, residual braze region remains at the bond coat/substrate interface). The top layer, region D, is, again, the TBC layer.

Furnace cycle testing (FCT) was carried out for the sample, as in Examples 1 and 2. Again, the comparative sample was substantially identical to the sample for this invention, except that it did not include the braze coating. The test results in this instance showed a 33% decrease in furnace cycle life, as compared to the comparative sample. Thus, a coating system in which a porous bond coat is almost entirely densified may not prove useful for improving furnace cycle life. However, such a coating system is useful for providing other attributes to the metal substrate, such as corrosion resistance.

Preferred and exemplary embodiments have been described herein. However, other modifications of the invention shall be apparent to those skilled in the art, from these teachings. Therefore, it is intended that all such modifications which fall within the true spirit and scope of this invention be secured by the appended claims.

All of the patents, articles, and texts mentioned above are incorporated herein by reference.

What is claimed:

1. An article, comprising a metal-based substrate, and at least two layers overlying the substrate, wherein one of the layers is a coating which comprises a braze alloy, and another layer is a plasma-sprayed bond coat.

2. The article of claim 1, wherein the braze alloy comprises a nickel-base or cobalt-base material.

3. The article of claim 2, wherein the braze alloy further comprises at least one component for lowering its melting point.

4. The article of claim 2, wherein the braze alloy comprises silicon, chromium, and nickel.

5. The article of article of claim 1, wherein the bond coat comprises an alloy of the formula MCrAlY, where M is selected from the group consisting of Fe, Ni, Co, and mixtures of any of the foregoing.

6. The article of claim 1, wherein the bond coat is partially densified.

7. The article of claim 6, wherein about 35% to about 65% of the depth of the bond coat is densified.

8. The article of claim 1, wherein the layer comprising the braze alloy lies directly over the substrate.

9. The article of claim 8, wherein the bond coat lies directly over the layer comprising the braze alloy.

10. The article of claim 9, wherein the bond coat is partially densified.

11. The article of claim 9, wherein a thermal barrier coating overlies the bond coat.

12. The article of claim 11, wherein the thermal barrier coating is zirconia-based.

13. A method for making the article of claim 12, wherein the bond coat is at least partially densified, comprising the following steps:
  (i) applying a braze alloy coating on the substrate, said coating comprising silicon, chromium, and nickel;
  (ii) plasma-spraying a bond coat over the braze alloy coating, said bond coat comprising an alloy of the formula MCrAlY, where M is selected from the group consisting of Fe, Ni, Co, and mixtures of any of the foregoing;
  (iii) applying a zirconia-yttria thermal barrier coating over the bond coat; and
  (iv) heat treating the braze alloy coating, to at least partially densify the bond coat.

14. The article of claim 1, wherein the bond coat lies directly over the substrate.

15. The article of claim 14, wherein the layer comprising the braze alloy lies directly over the bond coat.

16. The article of claim 15, wherein the layer comprising the braze alloy has been thermal-sprayed on the bond coat.

17. The article of claim 16, wherein the layer comprising the braze alloy has been thermal-sprayed on the bond coat by air plasma spray.

18. The article of claim 15, wherein a thermal barrier coating lies directly over the layer comprising the braze alloy.

19. The article of claim 15, wherein the bond coat is partially densified.

20. A method for making the article of claim 1, comprising the steps of applying a coating which comprises a braze alloy over the substrate, and plasma-spraying a bond coat over the substrate, wherein the overlying layers provide environmental protection to the substrate.

21. The method of claim 20, wherein the braze alloy comprises a nickel-base or cobalt-base material.

22. The method of claim 21, wherein the braze alloy comprises silicon, chromium, and nickel.

23. The method of claim 20, wherein the plasma-sprayed bond coat is substantially porous.

24. The method of claim 20, wherein the bond coat comprises an alloy of the formula MCrAlY, where M is selected from the group consisting of Fe, Ni, Co, and mixtures of any of the foregoing.

25. The method of claim 20, wherein the step of applying the coating which comprises a braze alloy over the substrate is carried out before the step of plasma-spraying the bond coat, said plasma-sprayed bond coat being, applied directly to the coating comprising the braze alloy.

26. The method of claim 25, wherein the coating comprising the braze alloy is fused to the substrate before the application of the plasma-sprayed bond coat.

27. The method of claim 25, wherein the plasma-sprayed bond coat is substantially porous.

28. The method of claim 27, wherein plasma-spraying of the bond coat is carried out by APS.

29. The method of claim 27, wherein the braze alloy is heat-treated after the application of the plasma-sprayed bond coat, to at least partially densify the bond coat.

30. The method of claim 29, wherein the heat-treatment is carried out in a vacuum.

31. The method of claim 29, wherein about 35% to about 65% of the depth of the bond coat is densified.

32. The method of claim 29, wherein the bond coat comprises an alloy of the formula MCrAlY, where M is selected from the group consisting of Fe, Ni, Co, and mixtures of any of the foregoing.

33. The method of claim 20, wherein the step of applying the coating, which comprises a braze alloy over the substrate is carried out after the step of plasma-spraying the bond coat, so that the plasma-sprayed bond coat is applied directly to the substrate, and the braze alloy overlies the bond coat.

34. The method of claim 33, wherein the layer comprising the braze alloy is thermal-sprayed on the bond coat.

35. The method of claim 34, wherein the layer comprising the braze alloy is thermal-sprayed on the bond coat by APS.

36. The method of claim 33, wherein the plasma-sprayed bond coat is substantially porous.

37. The method of claim 36, the braze alloy is heat-treated after the application of the plasma-sprayed bond coat, to at least partially densify the bond coat.

38. The method of claim 37, wherein the heat-treatment is carried out in a vacuum.

39. The method of claim 20, wherein a thermal barrier coating is applied over the substrate after the application of the bond coat and the coating which comprises a braze alloy.

40. The method of claim 39, the braze alloy is heat-treated after the application of the thermal barrier coating, to at least partially densify the bond coat.

41. An article, comprising:
  a nickel-base superalloy substrate;
  (ii) a braze alloy layer lying directly over the substrate, and comprising a nickel-base or cobalt-base material;
  (iii) a plasma-sprayed bond coat lying directly over the braze alloy layer, and comprising an alloy of the formula MCrAlY, where M is selected from the group consisting of Fe, Ni, Co, and mixtures of any of the foregoing; and
  (iv) a zirconia-based thermal barrier coating, applied directly over the bond coat.

42. The article of claim 41, wherein at least a portion of the bond coat adjacent the braze alloy layer is densified.

43. The article of claim 41, wherein the substrate is a component of a turbine engine.

44. An article, comprising:
  (i) a nickel-base superalloy substrate;
  (ii) a plasma-sprayed bond coat lying directly over the substrate, and comprising an alloy of the formula MCrAlY, where M is selected from the group consisting of Fe, Ni, Co, and mixtures of any of the foregoing;

(iii) a braze alloy layer lying directly over the plasma-sprayed bond coat; and (iv) a zirconia-based thermal barrier coating, applied directly over the braze alloy layer.

45. The article of claim 44, wherein the braze alloy layer has been thermal-sprayed on the bond coat.

46. The article of claim 45, wherein the braze alloy layer has been thermal-sprayed on the bond coat by air plasma spray.

47. The article of claim 44, wherein at least a portion of the bond coat adjacent the braze alloy layer is densified.

48. The article of claim 44, wherein the substrate is a component of a turbine engine.

49. An article, comprising:

(i) a metal-based substrate;

(ii) a dense bond layer over the substrate;

(iii) a substantially porous bond layer over the dense bond layer, having a microstructure which comprises an open network of interconnected pores; and (iv) a thermal barrier coating over the substantially porous bond layer;

wherein the dense bond layer has been formed by a heat-induced infiltration of a braze material into a porous bond region immediately below layer (iii).

50. The article of claim 49, wherein the dense bond layer is characterized by a microstructure which contains less than about 225 continuous strings of oxide greater than 25 microns in length, per square millimeter of sample, viewed in cross-section, as measured by an optical microscope, 1500×magnification.

* * * * *